United States Patent
Motro et al.

(10) Patent No.: US 6,744,614 B2
(45) Date of Patent: Jun. 1, 2004

(54) METAL-CLAD ELECTRICAL GEAR WITH A RUPTURE DISK PROTECTED AGAINST ATMOSPHERIC ATTACK

(75) Inventors: Pascal Motro, Montpellier (FR); Ollivier Lauret, Sete (FR)

(73) Assignee: Alstom, Paris (FR)

( * ) Notice: Subject to any disclaimer, the term of this patent is extended or adjusted under 35 U.S.C. 154(b) by 66 days.

(21) Appl. No.: 09/998,410

(22) Filed: Dec. 3, 2001

(65) Prior Publication Data

US 2002/0067584 A1 Jun. 6, 2002

(30) Foreign Application Priority Data

Dec. 6, 2000 (FR) .............................. 00 15783

(51) Int. Cl.⁷ ................................ H02H 1/00
(52) U.S. Cl. ..................... 361/123; 361/118; 361/119; 361/120; 361/125
(58) Field of Search ................ 361/123, 118, 361/119, 120, 111, 112, 129, 130, 137, 125, 45, 49, 50, 605, 604, 612, 613; 218/78

(56) References Cited

U.S. PATENT DOCUMENTS

| | | | |
|---|---|---|---|
| 3,889,083 A | * | 6/1975 | Guaglione et al. |
| 5,796,060 A | * | 8/1998 | Fuchsle et al. |
| 6,002,085 A | * | 12/1999 | Utsumi et al. |
| 6,134,100 A | * | 10/2000 | Hageli et al. |
| 6,545,241 B1 | * | 4/2003 | Franchi et al. |

FOREIGN PATENT DOCUMENTS

FR       2713837 A     6/1995

* cited by examiner

*Primary Examiner*—Anthony Dinkins
*Assistant Examiner*—Nguyen T. Ha
(74) *Attorney, Agent, or Firm*—Sughrue Mion, PLLC

(57) ABSTRACT

The gas insulated electrical gear includes at least one tank which is filled with a dielectric, gas and which is provided with a rupture disk which ruptures in the event of the dielectric gas in the tank reaching an excessive pressure so as to allow the gas to be exhausted from the tank. The rupture disk is protected against attack from the environment outside the tank by being placed inside the enclosed cabinet having an atmosphere in which temperature and humidity are controlled. The cabinet can be the low voltage and/or mechanical control supporting cabinet fitted to the electrical gear.

5 Claims, 2 Drawing Sheets

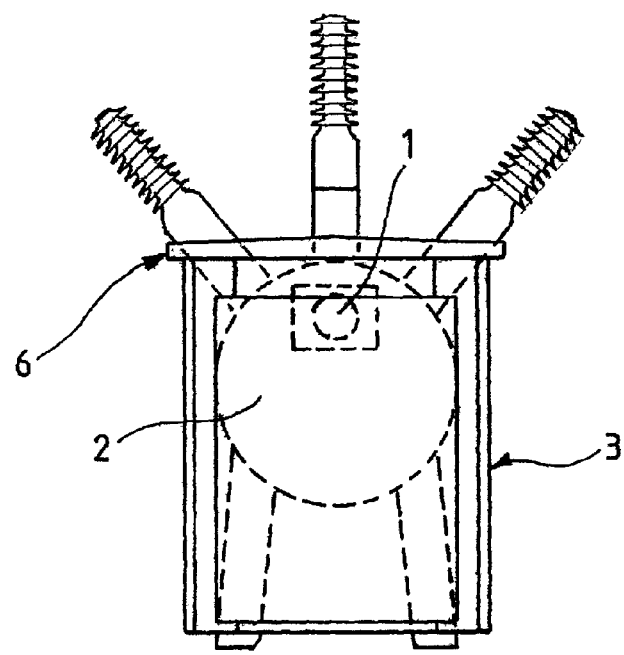
FIG_1
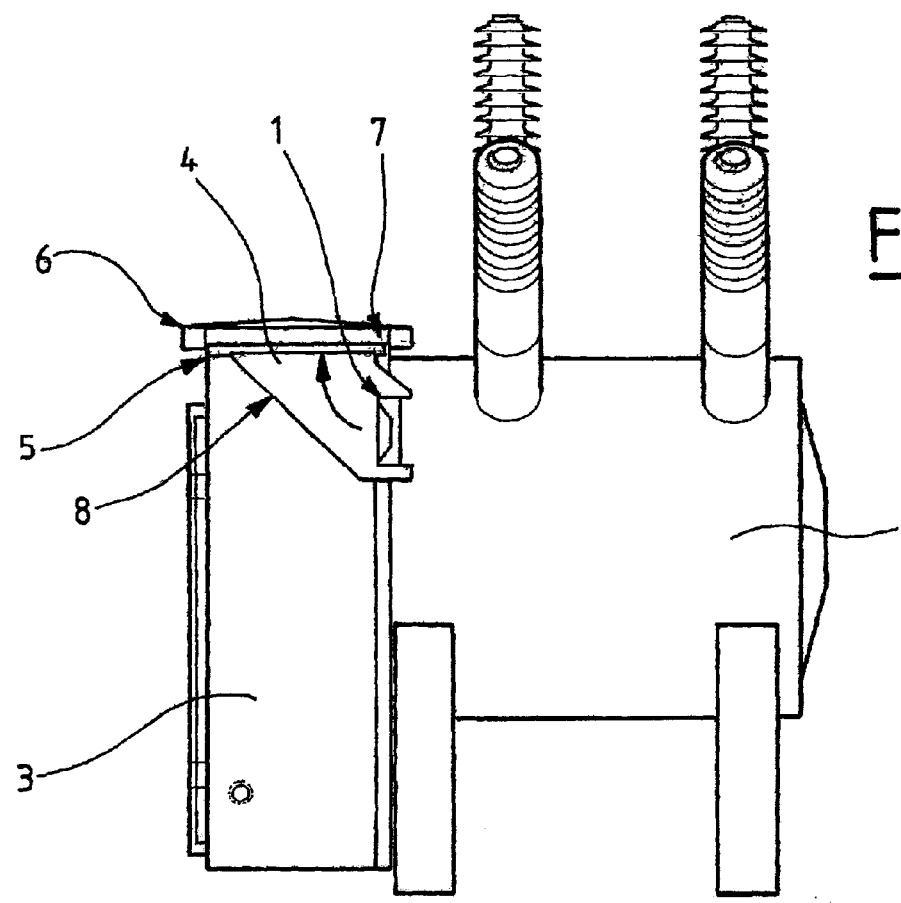
FIG_2

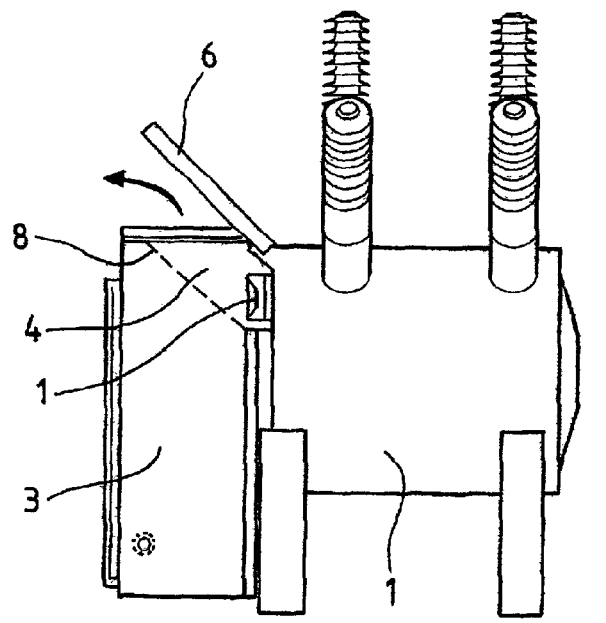
FIG_3
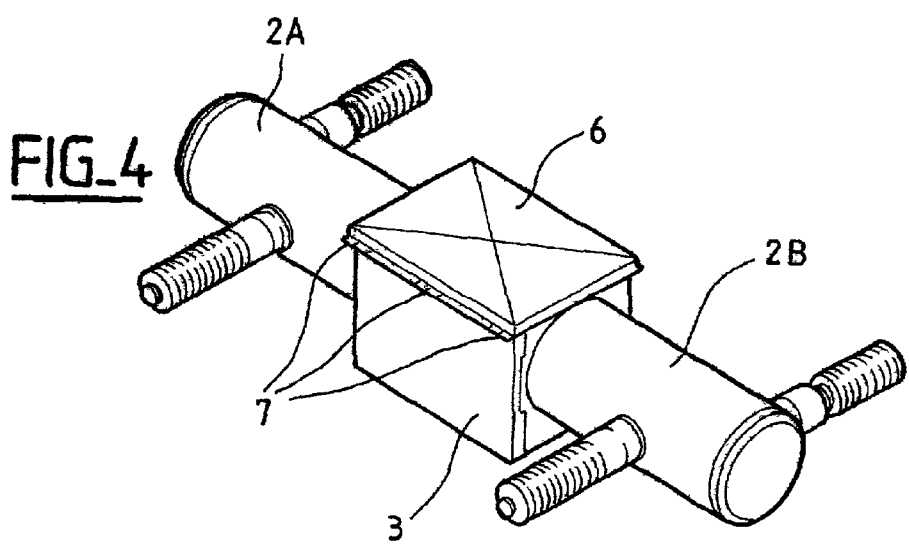
FIG_4
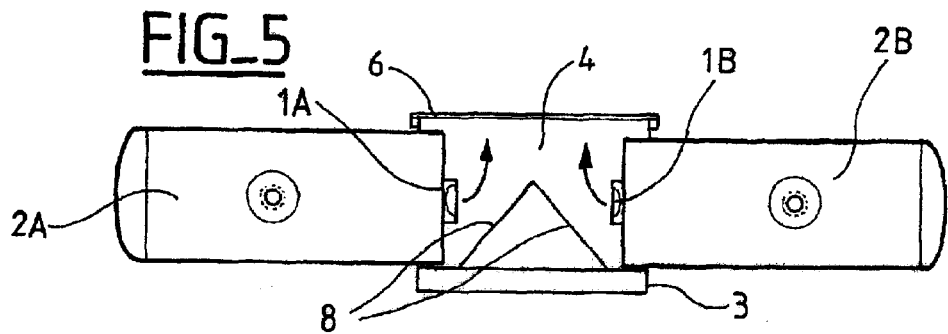
FIG_5

METAL-CLAD ELECTRICAL GEAR WITH A RUPTURE DISK PROTECTED AGAINST ATMOSPHERIC ATTACK The invention relates to gas insulated electrical gear comprising at least one tank filled with a dielectric gas and provided with a rupture disk which ruptures in the event of the dielectric gas in the tank reaching an excessive pressure so as to allow the gas to be exhausted from the tank. The material from which the disk is made can be metal, graphite, or some other material.

BACKGROUND OF THE INVENTION

Rupture of the disk serving as a pressure discharge device is obtained by making the disk itself fragile, i.e. by making it out of sheeting that is thinner than that of the remainder of the tank.

Such gear is generally situated in an environment that is not protected from bad weather and weather changes, but it can also be installed in a relatively protected environment, e.g. in sheltered premises.

If the rupture disk is not protected from the variations in the temperature of the environment outside the tank, differential expansion takes place between itself and the tank. Such differential expansion can degrade the mechanical performance of the rupture disk in the long run.

In addition, if this disk is not protected from the moisture and/or the pollution of the environment outside the tank, it can be subjected fairly quickly to corrosion phenomena as a result of the moisture or the condensation affecting the outside wall of the tank. Although it is possible to make the rupture disk out of a material that withstands corrosion, such as nickel, that solution remains very expensive. There is another solution which consists in protecting the main disk from external attack by means of a second rupture disk, as described in patent DE 3 743 562. However, that solution is difficult to implement so that rupture takes place correctly, and additional sealing is required to ensure that no external air penetrates into the space between the two rupture disks. Such a configuration is therefore difficult to implement and is expensive.

OBJECT AND SUMMARY OF THE INVENTION

The object of the invention is to provide a solution that is simple and of relatively low cost for protecting a pressure discharge device against atmospheric attack, the device being a rupture disk installed in gas-insulated electrical gear, for example.

To this end, the invention provides gas insulated outdoor electrical gear comprising at least one tank filled with a dielectric gas and provided with a rupture disk which ruptures in the event of the dielectric gas in the tank reaching an excessive pressure so as to allow the gas to be exhausted from the tank, wherein the rupture disk is protected against attack from the environment outside the tank by being placed inside an enclosed cabinet having an atmosphere in which temperature and humidity are controlled.

This cabinet can advantageously be a low voltage cabinet and/or a cabinet for supporting mechanical controls fitted to said electrical gear. In general, such a low voltage cabinet and/or mechanical control support cabinet is provided to maintain controlled temperature and humidity inside the cabinet. In particular, it is generally fitted with an anti-condensation and/or heating resistance that is controlled as a function of external atmospheric conditions and possibly as a function of the current being carried by the electrical gear on which the cabinet is mounted. Consequently, such a cabinet is well suited to performing the function of protecting a rupture disk against atmospheric attack.

To ensure that the insulating gas of the tank does not pollute the equipment in the cabinet in the event of the disk rupturing, the cabinet can have an opening that is closed by a flap. Thus, gas at excess pressure escapes from the tank because the disk ruptures, and it is guided to the opening of the cabinet by a deflector or an exhaust duct. The opening preferably lies in the top portion of the cabinet so as to reduce the risk of gas being projected towards people close by the cabinet.

BRIEF DESCRIPTION OF THE DRAWINGS

The electrical gear of the invention is described below in greater detail and is shown in the drawings.

FIG. 1 is a diagrammatic front view of electrical gear having a rupture disk protected by a low voltage and control-supporting cabinet.

FIG. 2 shows the electrical gear of FIG. 1 in side view.

FIG. 3 is a diagram showing how the cabinet opens to allow the gas at extra pressure to escape.

FIG. 4 shows two pieces of electrical gear sharing a common low-voltage and control-supporting cabinet that protects the rupture disks of both pieces of gear.

FIG. 5 shows an exhaust duct having two deflectors for gear disposed as shown in FIG. 4.

MORE DETAILED DESCRIPTION

In FIGS. 1 and 2, a rupture disk 1 is placed at one end of a cylindrical tank 2 of a piece of electrical gear, e.g. a metal-clad circuit breaker with gas insulation. A low-voltage and control-supporting cabinet 3 is mounted at this end of the tank 2. The rupture disk 1 is placed in an enclosure having a controlled atmosphere, in this case the cabinet 3. The rupture disk is thus protected from the outside environment.

The cabinet 3 is fitted with a heating and/or anti-condensation resistance so as to control temperature variations and humidity variations inside the cabinet.

The cabinet 3 has a roof 6 in the form of a lid hinged about an axis 7 and closing the roof opening. The roof 6 covers a partition 5 for isolating the exhaust gases from the remainder of the compartments and for allowing the excess pressure to be applied to the entire surface area of the lid 6. The gas at excess pressure which escapes from the tank 2 through the opening provided by the disk rupturing is guided to the partition 5 by a deflector 8 defining an exhaust duct 4. As shown in FIG. 3, the roof 6 of the cabinet opens under the pressure of the gas guided in the exhaust duct by the deflector 8 so as to allow the gas to escape upwards on leaving the cabinet 3.

In FIGS. 4 and 5, the cylindrical tanks 2A and 2B of two adjacent pieces of electrical gear, e.g. two gas-insulated metal-clad circuit breakers, are in axial alignment and they are held by a common low-voltage and control-supporting cabinet 3 which is interposed between the two tanks 2A and 2B. Each tank 2A, 2B has its own rupture disk 1A, 1B (visible in FIG. 5) at its end which lies within the cabinet 3. The cabinet 3 has a roof 6 hinged about an axis 7 and forming a flap which closes a roof opening through which the gas escaping from one of the tanks 2A, 2B in the event of its disk rupturing is exhausted. The exhaustion duct 4 advantageously has a double-deflector 8 performing the same function as the deflector shown in FIGS. 2 and 3, i.e. guiding the gas at excess pressure which escapes from the tank within the exhaust duct towards the roof 6. In addition, this double-deflector enables an expelled rupture disk to ricochet upwards, thus preventing it from damaging the other rupture disk which faces it.

What is claimed is:

1. Gas insulated electrical gear comprising at least one tank containing a dielectric gas and provided with a rupture disk which ruptures in the event of the dielectric gas in the tank reaching an excessive pressure so as to allow the gas to be exhausted from the tank, wherein the rupture disk is protected against attack from the environment outside the tank by being placed inside an enclosed cabinet having an atmosphere in which temperature and humidity are controlled.

2. The electrical gear of claim 1, in which the cabinet is a low voltage and/or mechanical control supporting cabinet fitted to said gear.

3. The electrical gear of claim 1, in which the cabinet has an opening closed by a flap, and in which the gas at excess pressure escaping through the opening in the tank left by the disk rupturing is guided to the opening of the cabinet by a deflector or an exhaust duct.

4. The electrical gear of claim 3, in which the flap forms the roof of the cabinet.

5. The electrical gear of claim 3, in which two tanks are adjacent to a common cabinet whose exhaust duct includes a double-deflector.

* * * * *